United States Patent
Feith et al.

(10) Patent No.: US 7,433,368 B2
(45) Date of Patent: Oct. 7, 2008

(54) SIGNALING TRANSPORT CONVERTER

(75) Inventors: Martin Feith, Saarbrücken (DE);
Markus Hauenstein, Düsseldorf (DE);
Thomas Mrotzek, Düsseldorf (DE)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 10/852,485

(22) Filed: May 25, 2004

(65) Prior Publication Data
US 2005/0129011 A1 Jun. 16, 2005

(30) Foreign Application Priority Data
Dec. 11, 2003 (EP) .................................. 03028439

(51) Int. Cl.
*H04J 3/16* (2006.01)
*H04J 3/22* (2006.01)
(52) U.S. Cl. ......................... 370/466; 370/467; 370/469
(58) Field of Classification Search ................. 370/466, 370/467, 469, 465, 389, 395.52, 395.6
See application file for complete search history.

(56) References Cited

U.S. PATENT DOCUMENTS

| | | | | |
|---|---|---|---|---|
| 6,678,242 | B1 * | 1/2004 | Simon | 370/218 |
| 6,990,089 | B2 * | 1/2006 | Benedyk et al. | 370/338 |
| 7,103,037 | B2 * | 9/2006 | Roque et al. | 370/356 |
| 2002/0048360 | A1 * | 4/2002 | Zambre et al. | 379/229 |
| 2002/0107966 | A1 * | 8/2002 | Baudot et al. | 709/227 |

OTHER PUBLICATIONS

Sprague, David et al., *"Transport Adapter Layer Interface"*, XP-002229824, May 28, 1999, pp. 1-30.

International Telecommunication Union, Q.2210; Series Q: Switching and Signalling Broadband ISDN—Signalling network protocols, "Message transfer part level 3 functions and messages using the services of ITI-T Recommendation Q.2140", Jul. 1996, pp. 1-23.

International Telecommunication Union, Q.2630.1; Series Q: Switching and Signalling Broadband ISDN—Common aspects of B-ISDN application protocols for access signalling and network signalling and interworking, "AAL type 2 signalling protocol—Capability set 1", Dec. 1999, pp. 1-46.

International Telecommunication Union, Q.2631.1; Series Q: : Switching and Signalling Broadband ISDN—Common aspects of B-ISDN application protocols for access signalling and network signalling and interworking, "IP Connection Control Signalling Protocol-Capability Set 1", Oct. 2003, pp. 1-44.

(Continued)

*Primary Examiner*—Firmin Backer
*Assistant Examiner*—Farah Faroul
(74) *Attorney, Agent, or Firm*—Squire, Sanders & Dempsey, L.L.P.

(57) ABSTRACT

For transmitting data in a communication network between a signaling entity and a peer signaling entity through a transport layer, such as TCP, a signaling transport converter STC on TCP is disclosed. The STC on TCP provides a signaling transport service for a connection between the signaling entity and the transport layer and comprises an interface to the signaling entity and an interface to the transport layer. The STC on TCP processes data to be exchanged between the signaling entity and the transport layer for a transparent transfer of the data to the peer signaling entity by means of the TCP transport layer. For providing a transaction-oriented data transport service, the STC on TCP may include a Message Wrapper which delineates a TCP based message stream and encapsulates/decapsulates the data to be exchanged.

34 Claims, 7 Drawing Sheets

OTHER PUBLICATIONS

International Telecommunication Union, Q.704; Series Q: Switching and Signalling Specifications of Signalling System No. 7-Message transfer part; "Signalling network functions and messages", Jul. 1996, pp. 1-205.

International Telecommunication Union, Q.2111; Series Q: Switching and Signalling Broadband ISDN-Signalling ATM adaptation layer (SAAL), "B-ISDN ATM adaptation layer-Service specific connection oriented protocol in a multilink and connectionless environment (SSCOPMCE)", Dec. 1999, pp. 1-112.

International Telecommunication Union, Q.2150.0; Series Q.2150.0; Series Q: Switching and Signalling Broadband ISDN-Signalling ATM adaptation layer (SAAL), "Generic Signalling Transport Service", May 2001, pp. 1-6.

International Telecommunication Union, Q.2150.1; Series Q.2150.0; Series Q: Switching and Signalling Broadband ISDN-Signalling ATM adaptation layer (SAAL), "Signalling transport converter on MTP3 and MTP3b", May 2001, pp. 1-26.

International Telecommunication Union, Q.2150.2; Series Q: Switching and Signalling Broadband ISDN-Signalling ATM adaptation layer (SAAL), "Signalling Transport Converter of SSCOP and SSCOPMCE", May 2001, pp. 1-25.

International Telecommunication Union, Q.2150.3; Switching and Signalling Broadband ISDN-Signalling ATM adaptation layer (SAAL), "Signalling Transport Converter on SCTP", Dec. 2002, pp. 1-15.

Transmission Control Protocol; "Darpa Internet Program Protocol Specification" RFC: 793; Sep. 1981, pp. 1-85.

Postel, J.; "User Datagram Protocol", RFC 768, Aug. 28, 1980, pp. 1-3.

Braden, R.; "T/TCP—TCP Extensions for Transactions Functional Specification"; Network Working Group, Jul. 1994, pp. 1-38.

Stewart, R. et al., "RFC-2960- Stream Control Transmission Protocol"; 2000, pp. 1-102.

* cited by examiner

| EVENT | STATE | | |
|---|---|---|---|
| | 1<br>STC Service Unavailable | 2<br>STC Association Establishment | 3<br>STC Service Available |
| POWER UP | - START-INFO to STC user<br>- Active TCP-OPEN request<br>→2 | | |
| TCP-COMMUNICATION_UP. indication | | - IN-SERVICE.indication to STC user<br>- Stop Timer_DELAY, if running<br>→3 | |
| TCP-COMMUNICATION_LOST. indication | | - OUT-OF-SERVICE. Indication to STC User<br>- Start Timer_DELAY<br>→1 | - OUT-OF-SERVICE. Indication to STC User<br>- TCP-CLOSE.request or TCP-ABORT.request<br>- Start Timer_DELAY<br>→1 |
| TRANSFER.request | Discard<br>→1 | Discard<br>→2 | - MW-ENCAP.request<br>- TCP-SEND.request<br>→3 |
| TCP-DATA-ARRIVE. indication | Discard<br>→1 | Discard<br>→2 | - TCP-RECEIVE.request<br>- MW-DECAP.request<br>- TRANSFER.indication to STC User<br>→3 |
| TIMER_DELAY EXPIRY | - Active TCP-OPEN request<br>→2 | | |

SIGNALING TRANSPORT CONVERTER

BACKGROUND OF THE INVENTION

1. Field of the Invention

The present invention relates to a signaling transport converter and/or to a system and/or method of transmitting data in a communication network between a signaling entity and a peer signaling entity through a transport layer by using such a signaling transport converter.

2. Related Prior Art

In the last years, the implementation and usage of data and telecommunication networks, i.e. of wire based networks, such as, for example, the Integrated Services Digital Network (ISDN), or wireless networks, such as, for example, the cdma2000 (code division multiple access) system, cellular $3^{rd}$ generation communication networks, the Universal Mobile Telecommunications System (UMTS), the General Packet Radio System (GPRS), the Wireless Local Area Network (WLAN), increased all over the world. Various organizations, such as the ITU-T (International Telecommunication Union—Telecommunications), the $3^{rd}$ Generation Partnership Project (3GPP), $3^{rd}$ Generation Partnership Project 2 (3GPP2), Internet Engineering Task Force (IETF), and the like are working on standardization for such networks.

In general, the system structure of a communication network is such that a user equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controlling the communication connection to and from the user equipment comprises components such as Base Transceiver Stations (BTS), Radio Network Controllers (RNC) and the like which are connected via an interface to a corresponding core or backbone network subsystem. The core (or backbone) network subsystem switches the data transmitted via the communication connection to a destination, such as another user equipment, a service provider (server/proxy), or another communication network. The core network subsystem may be connected to a plurality of access network subsystems. The respective network structure may vary, as known for those skilled in the art and defined in respective specifications, for example, for UMTS, GSM and the like.

Generally, for properly establishing and handling a communication connection between network elements such as the user equipment and another user terminal, a database, a server, etc., one or more intermediate network elements such as support nodes or service nodes are involved. Data, such as voice, multimedia, control signaling data and the like, are transmitted, for example, by means of a packet based data transmission. One example for a utilized packet based data transmission protocol is the Internet Protocol (IP).

An indispensible requirement for such telecommunication networks is a reliable transport of the control signaling between network elements. However, due to the fact that different types of transport protocols may be used, and due to the stack-like structure of the utilized protocols, the signaling transport between network entities requires special means and/or services provided in the nework structure.

One type of solution for providing a signaling transport service for signaling entities in a communication network is specified by the standardisation body ITU-T in the form of a so-called Signaling Transport Converter (STC). The STC is specified in the series ITU-T Q.2150.x, specifically in ITU-T Recommendation Q.2150.0 "Generic Signalling Transport Service", ITU-T Recommendation Q.2150.1 "Signalling Transport Converter on MTP3 and MTP3b" (MTP: Message Transfer Part), ITU-T Recommendation Q.2150.2 "Signalling Transport Converter on SSCOP (Service Specific Connection Oriented Protocol) and SSCOPME (Service Specific Connection Oriented Protocol Multilink or Connectionless Environment)", and ITU-T Recommendation Q.2150.3 "Signalling Transport Converter on SCTP (Stream Control Transmission Protocol)".

In general, the STC is used to exchange ATM (Asynchronous Transfer Mode) signaling messages with peer signaling entities and to receive information about the conditions of the signaling network. The introduction of the STC in the telecommunication network structure makes the transport layer independent of the application layer by means of which the reliability of the transport link for data transmission is increased. In other words, the concept of STC makes a signaling application independent of its transport layers. One major benefit of this concept of STC is that a change of the transport protocol used for the signaling transport does not require a modification of the signaling application itself.

Figure 7:
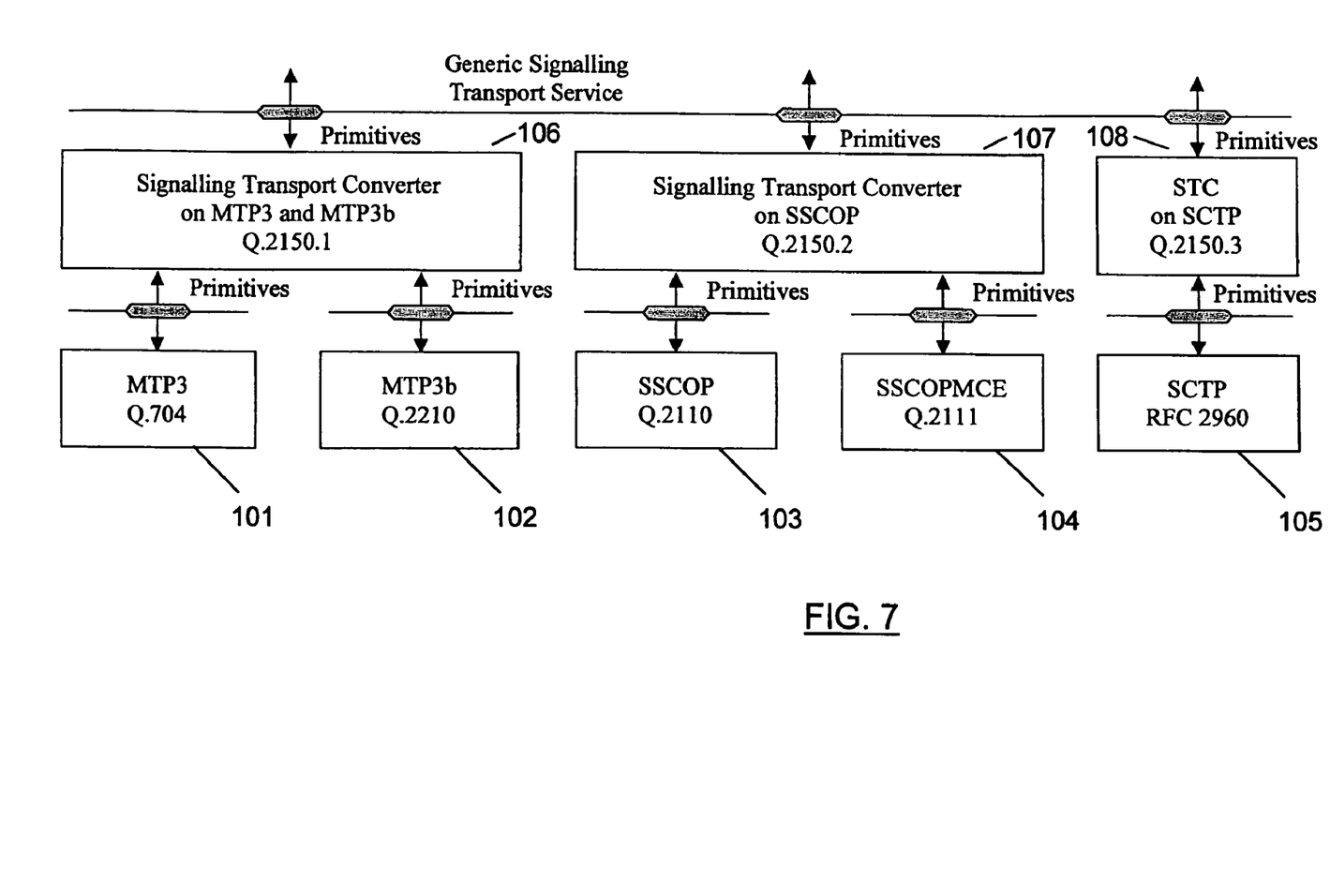
FIG. 7 shows an example of protocol stacks for a generic signaling transport service according to the prior art.

According to the ITU-T standard, all variants of STC provide the same services to the signaling application by a well-defined interface. In FIG. 7, an exemplary overview of the existing STC standards and the underlying transport protocols according to the ITU-T Recommendations is shown (FIG. 7 is based on an excerpt from ITU-T Q.2150.0 "Example protocol stacks for the Generic Signalling Transport Service" (FIG. 5-2/Q.2150.0)).

In detail, reference signs 101 to 105 denote the respective transport layers defined by the respective protocols. Additionally, the respective specifications or sources of the protocols is given, i.e. ITU-T Recommendations Q.704 and Q.2210 for MTP3 and MTP3b, respectively, ITU-T Recommendations Q.2110 and Q.2111 for SSCOP and SSCOPMCE, respectively, and IETF Request for Comments (RFC) 2960 for SCTP. Reference signs 106 to 108 denote the STCs defined by the ITU-T Recommendations Q.2150.x mentioned above which are linked to their respective transport layer(s) by means of commonly known interfaces. Via these interfaces, information elements or primitives are transmitted between the STCs and the transport layers which are described, for example, in the ITU-T Q.2150.x and thus not explained in detail at this point. On the other hand, the STCs 106 to 108 are linked to respective signaling entities (not shown in FIG. 7) via another interface. Over this interface, also information elements or primitives are transmitted to and from the STCs. For the connection between the STC and the signaling entity, a Generic Signaling Transport service according to ITU-T Q.2150.0 is used by means of which the idiosyncrasy of the underlying signaling transport mechanism must not be considered by the signaling application.

However, there may be a problem concerning the compatibility of the existing STC concepts to recent or future implementations of network elements. For example, in case of a BTS which is internally based on an IP architecture between the transport and baseband part, the implementation of the existing STC solutions may be problematic or they are even not applicable. According to the structure of such BTS, the Transport part connects the standard Iub/ATM interface to the internal IP architecture. For the control of the IP streams for the user traffic at point-to-point connections, an inter-node protocol and nodal functions are required, which may be based, for example, on an IP connection control signaling defined by ITU-T Recommendation Q.2631.1 "IP connection control signalling protocol Capability Set 1". Such an IP connection control signaling is in particular selected to control the IP streams for the user traffic with respect to the Open BTS Architecture Initiative (OBSAI), which specifies vendor independent interfaces between BTS modules.

Currently, according to ITU-T, when an IP transport is used in the architecture of a BTS, for example, the IP connection control signaling uses services provided by the "STC on Stream Control Transmission Protocol (SCTP)" according to ITU-T Recommendation Q.2150.3. According to RFC 2960 "Stream Control Transmission Protocol", the SCTP is "designed to transport PSTN signaling messages over IP networks, but is capable of broader applications. SCTP is a reliable transport protocol operating on top of a connectionless packet network such as IP. It offers the following services to its users:

- acknowledged error-free non-duplicated transfer of user data,
- data fragmentation to conform to discovered path MTU size,
- sequenced delivery of user messages within multiple streams, with an option for order-of-arrival delivery of individual user messages,
- optional bundling of multiple user messages into a single SCTP packet, and
- network-level fault tolerance through supporting of multi-homing at either or both ends of an association.

The design of SCTP includes appropriate congestion avoidance behavior and resistance to flooding and masquerade attacks."

Thus, when applying SCTP in the interface between the transport and baseband part of a BTS, in particular in case of a BTS being internally based on an IP architecture between the transport and baseband part, there may arise a problem in that SCTP is not optimized with respect to such network components as SCTP provides many not needed services which in turn consume a lot of resources. Furthermore, SCTP components may show some difficulties with respect to reliability and availability as SCTP has been specified in October 2000, and updated in September 2002, which may lead to unwanted problems in the implementation phase due to not yet discovered compatibility problems. In other words, the maturity and availability of SCTP is not ensured.

SUMMARY OF THE INVENTION

Thus, the present invention aims to provide a new solution for a signaling transport service and/or STC by means of which a reliable signaling transport between signaling entities is possible while the implementation thereof can be effected easily and with a low risk of compatibility problems.

This is achieved by the measures defined in the appended claims.

According to one aspect of the proposed solution, there is provided, for example, a system for transmitting data in a communication network between a signaling entity and a peer signaling entity through a transport layer, the system comprising signaling transport converter means for providing a signaling transport service for a connection between the signaling entity and the transport layer, wherein the signaling transport converter means comprises an interface to the signaling entity and an interface to the transport layer, and is adapted to process data to be exchanged between the signaling entity and the transport layer for a transparent transfer of the data to the peer signaling entity by means of the transport layer.

Furthermore, according to one aspect of the proposed solution, there is provided, for example, a signaling transport converter usable for transmitting data in a communication network between a signaling entity and a peer signaling entity through a transport layer, and providing a signaling transport service for a connection between the signaling entity and the transport layer, wherein the signaling transport converter comprises an interface to the signaling entity and an interface to the transport layer, and is adapted to process data to be exchanged between the signaling entity and the transport layer for a transparent transfer of the data to the peer signaling entity by means of the transport layer.

Moreover, according to one aspect of the proposed solution, there is provided, for example, a method of transmitting data in a communication network between a signaling entity and a peer signaling entity through a transport layer, the method comprising a step of providing a signaling transport service for exchanging data by means of connecting the signaling entity and the transport layer, wherein the step of providing the signaling transport service comprises substeps of receiving and transmitting data to be exchanged between the signaling entity and the transport layer in a signaling transport converter, processing the data to be exchanged between the signaling entity and the transport layer in the signaling transport converter, and transparently transferring the data to the peer signaling entity by means of the transport layer.

According to further refinements, the proposed solution may comprise one or more of the following features:

- the signaling transport converter means may further comprise a message wrapper unit providing a transaction-oriented data transport service which is used for processing the data to be exchanged;
- the message wrapper unit may be adapted to encapsulate the data to be exchanged in the direction from the signaling entity to the transport layer, and to decapsulate the data to be exchanged in the direction from the transport layer to the signaling entity;
- the message wrapper unit may be adapted to prepend a message header before a message comprising at least a part of the data to be exchanged for encapsulating the data to be exchanged, wherein the message header comprises at least a record marking for delineating the message with regard to a message stream based on the protocol used by the transport layer;
- a value of the record marking may be fixed;
- a value of the record marking may be based on an uncorrelated noise-like sequence;
- the message header may further comprise a length field indicating the length of the message comprising the data to be exchanged and the length of the message header;
- for decapsulating the data to be exchanged, the message wrapper unit may be adapted to identify the record marking in a message stream based on the protocol used by the transport layer;
- message wrapper unit may be adapted to use the record marking for synchronization;
- the message wrapper unit may be adapted to interpret data following after the identified record marking as a length field and/or as the message comprising at least a part of the data to be exchanged;
- the message wrapper unit may be adapted to process the data to be exchanged by providing a plurality of messages each of which comprising at least a part of the data to be exchanged, and by prepending a respective message header before each of the plurality of messages for encapsulating the data to be exchanged;
- information elements may be transmitted between the signaling transport converter means and the signaling entity for controlling the signaling transport converter means, between the signaling transport converter means and the transport layer for controlling the signaling transport converter means, and/or between the signaling transport converter means and the message wrapper unit, if provided, for controlling the signaling transport converter means and/or the message wrapper unit;

the signaling transport converter means may be further adapted to establish and maintain a connection to the transport layer on behalf of the signaling entity;

the signaling transport converter means may be adapted to monitor an availability/unavailability of data transfer through the transport layer and to inform the signaling entity about the availability/unavailability;

the signaling entity may be a signaling application which may be provided on a layer being different to the transport layer;

the signaling transport converter means may be provided in a sub-layer on top of the transport layer;

the transport layer may be based on the Transmission Control Protocol (TCP);

the signaling transport converter means may be based on the Generic Signaling Transport service, for example, according to the ITU-T Q.2150.0 specification.

By virtue of the proposed solutions, the following advantages can be achieved:

It is possible to provide a new type of STC which is usable on the Transmission Control Protocol (TCP) (also referred to as STC on TCP). TCP, which is defined, for example, in RFC 793 "Transmission Control Protocol", is a connection-oriented protocol that is an integral part of most operation systems. Its maturity and reliability has been proven for several years and provides a reliable transport service with congestion control by a window algorithm and error check. On the other hand, the STC on TCP may provide the services required by the Generic Signaling Converter according to ITU-T Q.2150.0 to the signaling application and may use the transport services of TCP. Such, reliable interfaces to the signaling application as well as to TCP can be ensured.

By providing the sub-component "message wrapper unit" (also referred to as Message Wrapper), it is possible to add internally the features for transaction-oriented transport that TCP does not provide.

By means of the proposed measures, a standardized solution to transport transaction-oriented signaling applications on top of the transport protocol, which is, for example, TCP, is provided. This means that the solution is also applicable to systems that do not support SCTP. There may be provided a TCP application programming interface (API) between the STC and the TCP layer, which depends on the operating system. Furthermore, it is possible to provide a general STC on TCP which is applicable to a plurality of reference TCP implementations.

It is possible to facilitate the ATM/IP interworking functionality without imposing any requirement towards other network element. This is in particular preferable with regard to OBSAI as an open transport interface. For example, the solution can be utilized in an IP based BTS architecture for establishing the transport link between the Transport Module and the Baseband Module for IP connection control signaling.

The above and still further objects, features and advantages of the invention will become more apparent upon referring to the description and the accompanying drawings.

DESCRIPTION OF PREFERRED EMBODIMENTS

In the following, a preferred embodiment of the invention is described with reference to FIGS. 1 to 6.

Figure 1:
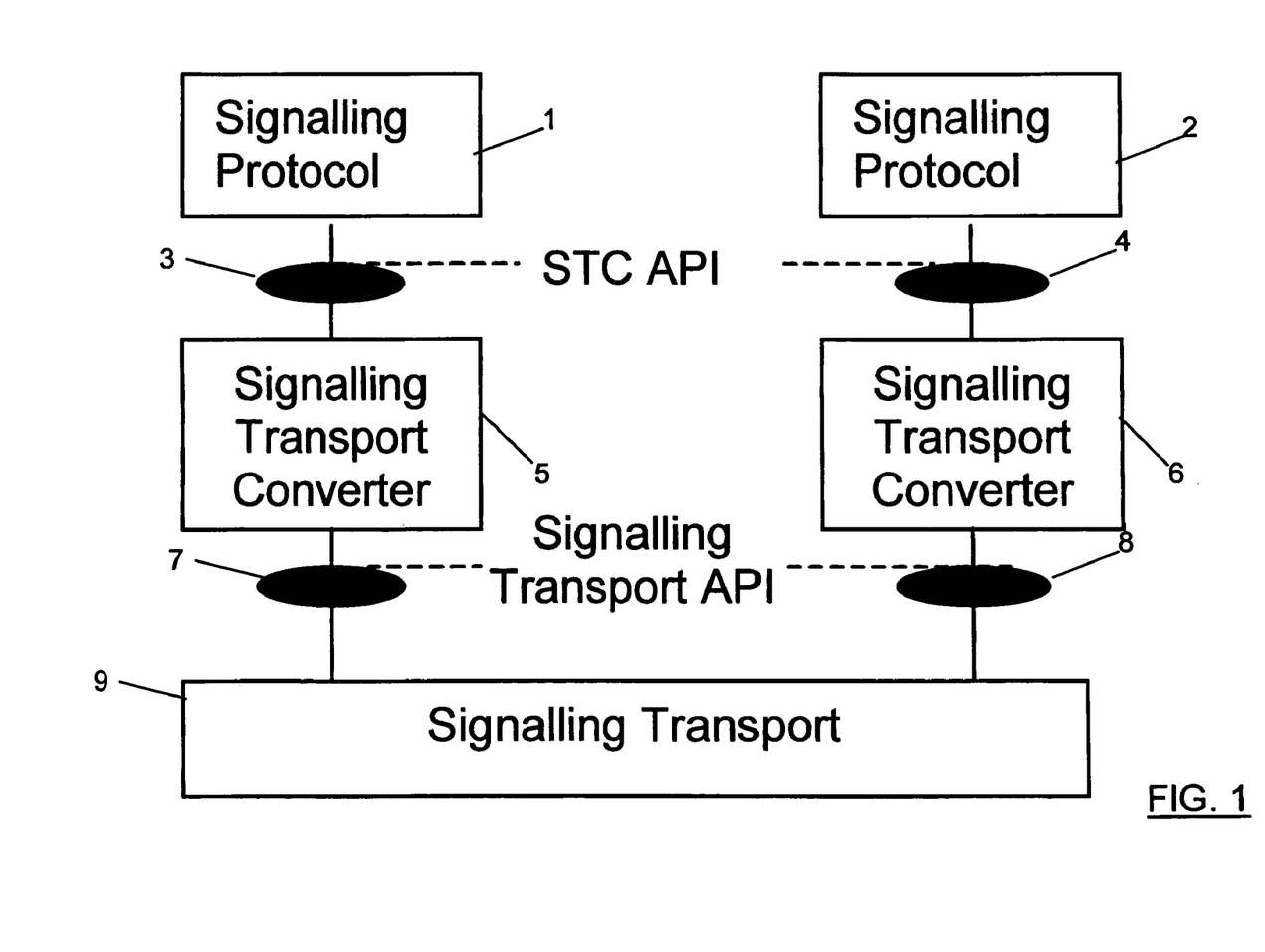
FIG. 1 shows a general structure of a transport mechanism using a signaling transport converter.

In FIG. 1, the general structure of a signaling transport mechanism using a signaling transport converter (STC) is shown. Reference signs 1 and 2 denote respective signaling entities using a respective signaling protocol.

Reference signs 5 and 6 denote signaling transport converters (STC). The signaling entity 1 is connectable to the STC 5 via a STC application part interface (API) 3. The signaling entity 2 is connectable to the STC 6 via a STC application part interface (API) 4. The signaling entity 1 and 2 may be, for example, AAL (ATM Adaption Layer) type 2 signaling entities or IP connection control signaling entities. Reference sign 9 denote a signaling transport layer via which signaling data or messages can be transmitted between the signaling entities 1 and 2. The signaling transport layer is connected to the STC 5 and 6 through signaling transport API 7 and 8, respectively.

Generally, the STC enables a signaling entity 1 to communicate with a peer signaling entity 2, for example, independently of the underlying signaling transports. In that way it is quite easy to replace the underlying signaling transport.

The signaling protocol entity may use the Generic Signaling Transport service according to ITU-T Q.2150.0, which is provided by the STC. Conceptually, there exists one STC entity per signaling association. Information elements or primitives as well as parameters transmitted between the signaling entities and the Generic Signaling Transport entity are given in the following Table 1 which is based on the ITU-T Q.2150.0 Recommendation.

TABLE 1

Primitives and parameters of the Generic Signaling Transport sublayer

| Primitive | Type | | | |
| --- | --- | --- | --- | --- |
| Generic Name | Request | Indication | Response | Confirm |
| START-INFO | — | Max_length CIC_Control | — | — |
| IN-SERVICE | — | Level | — | — |
| OUT-OF-SERVICE | — | (Note 1) | — | — |

TABLE 1-continued

Primitives and parameters of the Generic Signaling Transport sublayer

| Primitive | Type | | | |
|---|---|---|---|---|
| Generic Name | Request | Indication | Response | Confirm |
| CONGESTION TRANSFER | — Sequence Control STC user Data Priority (Note 2) | Level STC User Data Priority (Note 3) | — | — |

— = This primitive is not supported
Note 1:
This primitive has no parameter
Note 2:
Sequence Control and Priority may be not supported
Note 3:
Priority may be not supported Generally, the STC state machine at this interface (i.e. between the signaling entity and the STC) knows about three states:
Start
Out of service
In Service It is to be noted that the above mentioned interface may be specified according to ITU-T Q.2150.0. In this specification, the indication "Level" is described as a parameter indicating the level of congestion. This variable can hold the values from a level indicating "no congestion" through to a level indicating "maximum congestion" in increments. The value for indicating "no congestion" and "maximum congestion" as well as the number of steps of congestion level and/or amount of increase/decrease are considered to be network implementation dependent. The meaning of the "Level" parameter in the IN_SERVICE is similar to that in CONGESTION. A difference may be that CONGESTION is usable if the level value changes, while IN_SERVICE is used when the connection recovers from Out of Service, for example.

On the establishment of a signaling transport converter entity and the associated signaling transport converter user entity (i.e. of the signaling entity), for example at a power up, the initial condition is the same as if an OUT-OF-SERVICE. indication primitive had been conveyed across this service access point (SAP). Also at this time the START-INFO.indication is sent to the signaling entity. Regarding the interface between the STC and the signaling entity as well as the information elements or primitives used thereon, further details are equivalent to those defined in ITU-T Q.2150.0 so that a detailed description thereof is omitted.

Figure 2:
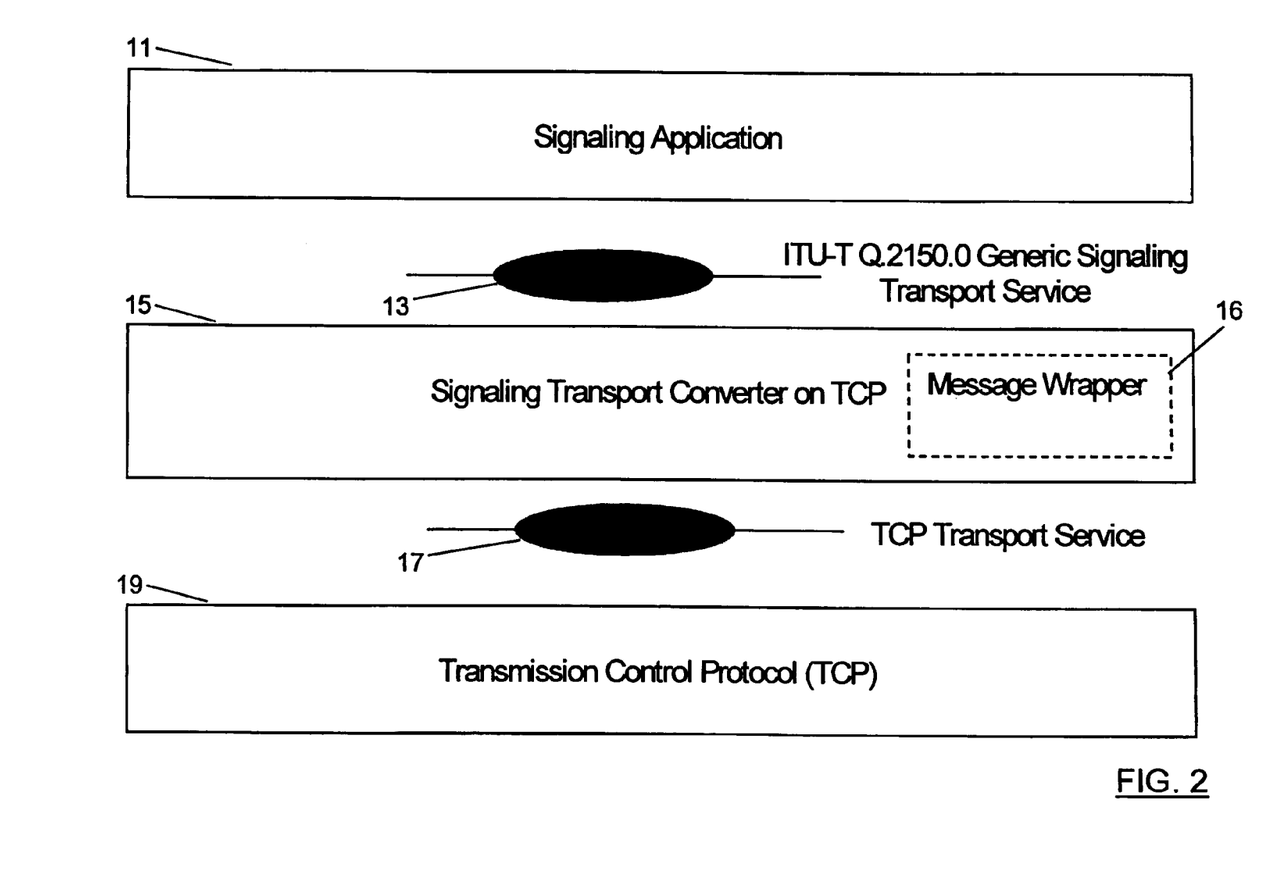
FIG. 2 shows a structure of a signaling transport converter according to an embodiment.

Referring to FIG. 2, a preferred embodiment of a STC applicable in the signaling transport mechanism according to FIG. 1 is shown. In this FIG. 2, a so-called STC on TCP (Transmission Control Protocol) is defined. Reference sign 11 denotes a signaling application (or signaling entity). Reference sign 15 denotes the signaling transport converter on TCP. The STC on TCP 15 further includes a sub-component 16 which is also referred to as a message wrapper unit (or Message Wrapper). Reference sign 19 denotes a TCP layer as a transport layer for transporting data to and from the signaling application 11 via the STC on TCP 15. For the connection between the signaling application 11 and the STC on TCP 15, an interface 13 is provided which establishes a link for fulfilling the requirements according to the ITU-T Q.2150.0 Generic Signaling Transport service. On the other hand, for the connection between the STC on TCP 15 and the TCP layer (or entity) 19, an interface 17 is provided which establishes a link for fulfilling the requirements according to the TCP Transport service.

For the function of STC on TCP 15, the ITU-T Q.2150.0 Recommendation is applicable. The specific STC behavior and its interface to TCP and Message Wrapper 16 are specified in the following.

First, the structure of the STC on TCP 15 sublayer is described in further detail. The sublayer providing the STC 15 resides on top of the Transmission Control Protocol (TCP) layer 19. It employs the services provided by the TCP according to RFC 793 "Transmission Control Protocol". Furthermore, STC on TCP 15 provides the service that is requested by the Generic Signaling Transport service according to ITU-T Q.2150.0. Additionally, a message-oriented structure may be added by the STC on TCP 15 into the TCP payload. The latter function is performed by the STC sub-component Message Wrapper 16 shown in FIG. 2.

In the following, also with reference to FIGS. 3 to 5, the interactions between the STC 15 and the signaling protocol entity 11, the interactions between the STC 15 and the TCP layer 19, the services provided by the Message Wrapper sub-component 16, and the interactions between the STC 15 and a layer management (it is to be noted that layer management primitives are not included in FIG. 5) will be described.

Figure 4:
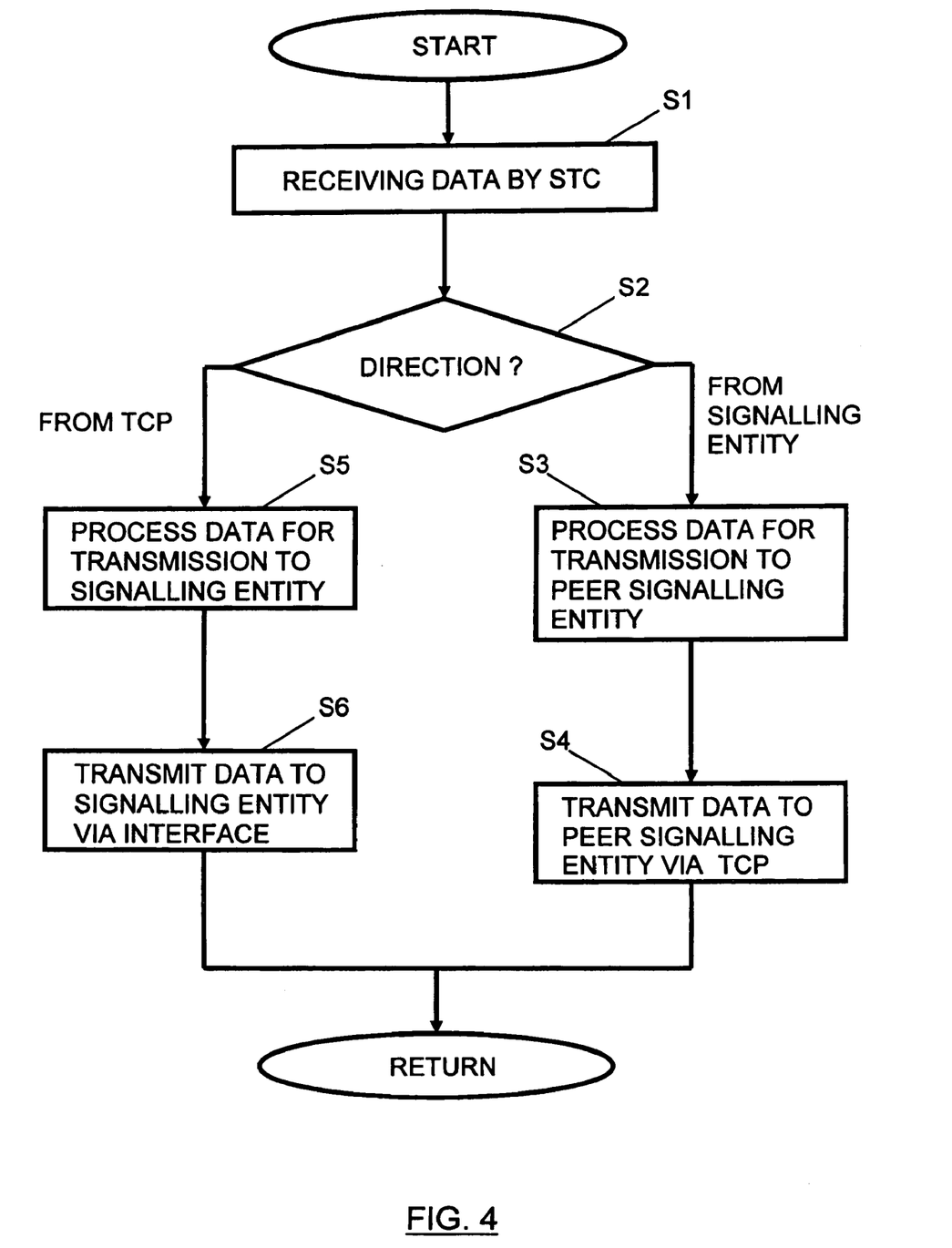
FIG. 4 shows a flowchart of an example for a data transmission procedure of a signaling transport converter according to the embodiment.

First, with reference to FIG. 4, a flowchart is described which defines a general procedure for a data transmission by using the STC on TCP 15 of FIG. 2. After starting the procedure, for example, at a power up and the establishment of the STC entity and STC user entity, the STC 15 receives data (step S1). Then, in step S2, it is decided from which direction the data are received, i.e. either from the transport layer 19 (TCP) or the signaling application 11. This decision may be based, for example, on a determination of the interface 13 or 17, over which the data are received.

In case the decision in step S2 results in a receipt of data from the signaling entity 11, in step S3, the data are processed for preparing a transmission thereof to the destination point (i.e. the peer signaling entity). The processing of step S3 may be at least partly performed by the message wrapper unit 16 and may comprise, for example, a delineation, encapsulation and the like, which will be described below. Then, in step S4, the processed data are transmitted through the interface 17 to the TCP layer in order to effect a transparent transmission thereof to the peer signaling entity. Thereafter, the STC is ready to repeat the procedure.

It is to be noted that at the receiving end (i.e. at the peer signaling entity side) another STC on TCP entity may be provided for receiving the data transported via the TCP layer.

On the other hand, when in step S2 the receipt of data from the TCP layer 19 is determined, step S5 follows in which the received data are processed for being transmitted to the signaling entity 11 (destination point). The processing of step S5 may be at least partly performed by the message wrapper unit 16 and may comprise, for example, decapsulation and the like, which will be described below. Then, in step S6, the processed data are transmitted through the interface 12 to the signaling entity 11. Thereafter, the STC is ready to repeat the procedure.

Next, the services provided by the STC on TCP 15 are explained in greater detail. The STC 15 provides for the transparent transfer of data, i.e., signaling application 11 (also referred to as STC user) data between peer STC users 1 and 2 (FIG. 1). The supporting communication resources to achieve this transfer stay invisible to the signaling application.

In particular, the STC service provides for an independence from the underlying signalling bearer protocol. This means that the STC service relieves its users from all concerns of the manner in which the STC service is provided. Except for possible influences of the quality of service, the transfer of data over different underlying networks is, thus, invisible to the STC user.

Additionally, the STC service provides for a transparency of the information to be transferred (or exchanged). This means that the STC service provides for the transparent transfer of octet-aligned STC user data between peer STC users. Regarding the function of the Message Wrapper sub-component 16, which will be further described below, it adds a record marking (also referred to as "marker") to delineate messages to the stream-oriented nature of TCP. Even though this may influence the conveyance of messages, this is invisible for the STC user. In detail, the Message Wrapper 16 is adapted to encapsulate STC user data in a transmit direction before a transfer to TCP sublayer and to decapsulate TCP data in a receive direction before transfer to STC user 11.

Additionally, it is to be noted that push facility is to be used so as to ensure that a complete message is transferred via TCP at once and as early as possible.

Furthermore, the STC on TCP 15 may be applicable for the management of associations. In detail, the STC service may provide for a permanent connection service. As the underlying service (i.e. TCP 19) needs to have a signaling association established, the STC 15 establishes and maintains this connection on behalf of its user (signaling application 11); the user may be informed about the availability/unavailability of the data transfer service.

In the following, the functions of the STC on TCP 15 are described in further detail. The STC 15 performs the following functions:

a) Association establishment and maintenance:
This function provides for the establishment and maintenance of an TCP signaling connection. The STC 15 may be adapted to attempt to re-establish a new TCP connection on behalf of its user in the event of a loss of TCP connectivity.

b) Service availability reporting to the STC user:
This function reports the availability or unavailability of an TCP service to the STC user 11 and also to Layer Management.

c) Maximum length indication to the STC user:
This function indicates to the STC user 11 the maximum length of the packet data unit (PDU) that the STC 15 can transfer. This may be indicated at the creation of the STC entity.

d) Call Instance Code (CIC) control indication to the STC user:
This function indicates to the STC user 11, at creation of the STC entity, whether it serves as the controlling node of the call association.

With regard to the message wrapper unit 16, additionally the following Message Wrapper services may be used:

a) Message Delineation;
b) Encapsulation of STC user data before transfer to TCP 19;
c) Decapsulation of TCP data before transfer to STC user 11 (coming encapsulated via TCP 19).

This is based on the introduction of the record marking (or marker) by the message wrapper unit 16.

In addition, the following TCP services may be used:

a) Acknowledged error-free non-duplicated transfer of user data;
b) Sequenced delivery of user data;
c) Forced data delivery via Push Flag (as mentioned above).

The latter TCP services may also be supplemented by the following TCP services:

a) Data fragmentation to conform to discovered path MTU (Maximum Transmission Unit) size,
b) Appropriate IP congestion avoidance behaviour.

For the layer-to-layer communication between the different entities and sub-components, i.e. between the signaling entity 11, the STC on TCP 15, the Message Wrapper 16, and the TCP layer 19, several elements and/or primitives are required which are described herein below. Primitives between the STC 15 and the signaling protocol entity 11 as well as the information flow across the STC 15—signaling protocol entity 11 boundary is represent in Table 1 indicated above.

Primitives between the STC 15 and the TCP layer (or entity) 19 as well as the information flow across the STC-TCP boundary may be based, for example, on those defined in RFC 793, section 3.8, and are therefore not explained here in greater detail. A concrete usage of the primitives at this boundary are described below in connection with the definition of the procedures of the STC.

Primitives between the STC 15 and Message Wrapper 16 as well as the information flow across the STC-Message Wrapper boundary are shown in Table 2. In this table, the abbreviation MW refers to "Message Wrapper", the abbreviation ENCAP refers to "encapsulation", and the abbreviation DECAP refers to "decapsulation".

TABLE 2

Primitives and parameters between the STC and Message Wrapper

| Primitive | Attributes | Return values |
| --- | --- | --- |
| MW-ENCAP.request | STC user data | STC user data + Message Wrapper protocol control information |
| MW-DECAP.request | Received TCP data | Reassembled STC user data<br>Status (Note 1) |

NOTE 1:
Status can be one of the following:
STC user data (signaling message) available. In this case the reassembled STC user data are handed over to STC.
STC user data reassembly ongoing, no handover of data to STC.
STC user data reassembly error, no handover of data to STC and affected data are discarded.
Whether layer management is informed about an reassembly error can be specified depending on implementation requirements.

Furthermore, primitives between the STC 15 and a layer management (not shown) as well as the information flow across the STC-Layer Management boundary are to be defined. The repertoire of primitives between STC and layer management is listed in following Table 3.

TABLE 3

Primitives and parameters between the STC and layer management

| Primitive | Attributes | Content |
| --- | --- | --- |
| MSTC-TCP-COMMUNICATION_UP. Indication | | Mapped from TCP-COMMUNICATION_UP. indication (Note 1) |

TABLE 3-continued

Primitives and parameters between the STC and layer management

| Primitive | Attributes | Content |
| --- | --- | --- |
| MSTC-TCP-COMMUNICATION_LOST. indication | Cause (Note 3) | Mapped from TCP COMMUNICATION_LOST. Indication (Note 2) |

NOTES

TCP-COMMUNICATION_UP.indication represents, depending on the TCP implementation, the return value or the indication generated by TCP that informs the served user about availability of the TCP connection.
TCP-COMMUNICATION_LOST.indication represents, depending on the TCP implementation, one or many indications generated by TCP that inform the served user about unavailability of the TCP connection.
Cause is an optional attribute that is used to report the reason for the loss of TCP connection In the above table 3, the definition MSTC is used to denote that these STC primitives are exchanged with the Layer Management. Layer Management is a concept that comprises the Management functions and services for a particular protocol layer such as configuration parameters and alarms.

Next, protocol elements for the Peer-to-Peer Communication (i.e. for the communication between the signaling entities 1 and 2 of FIG. 1, for example) are described.

Figure 3:
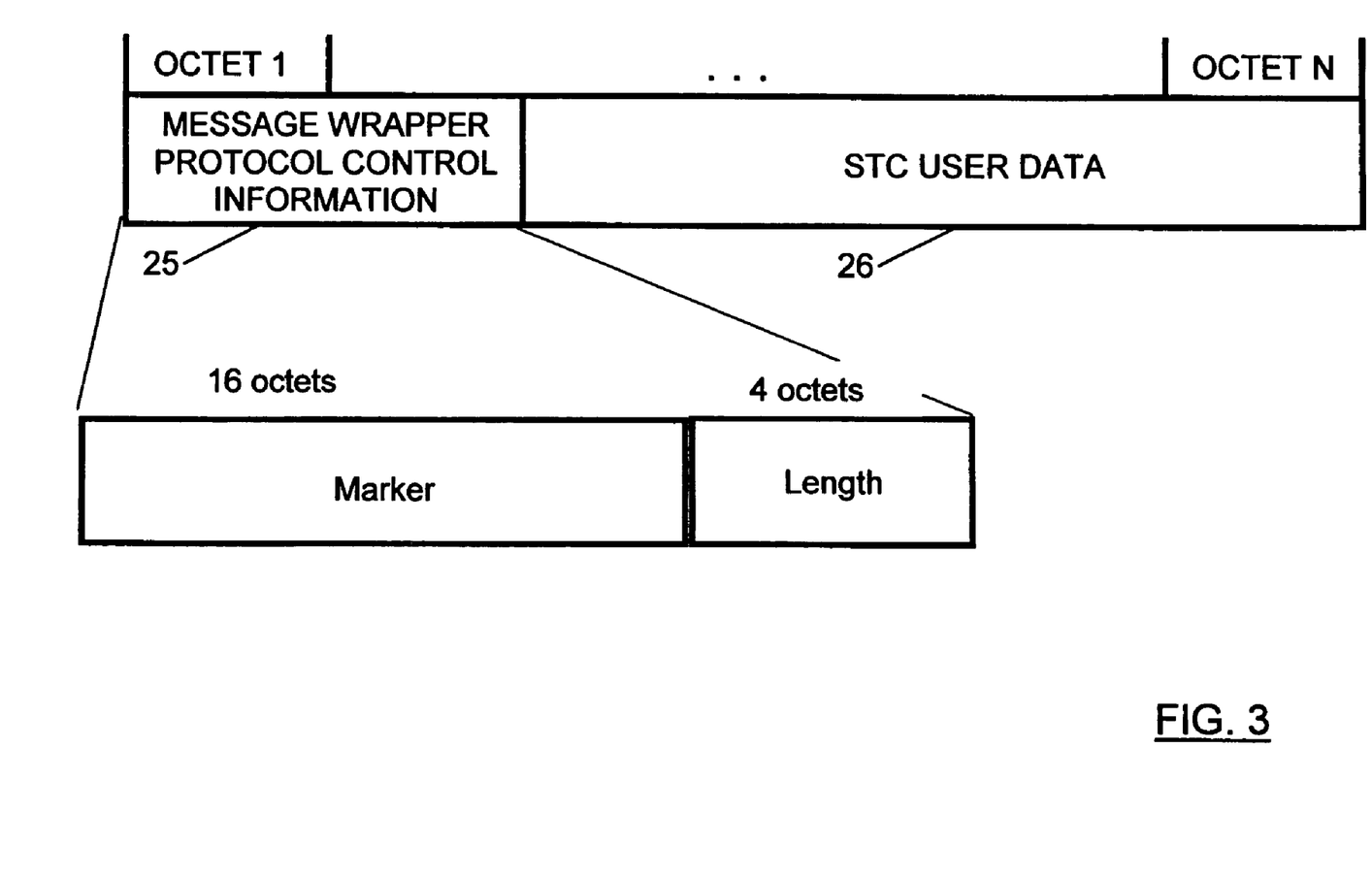
FIG. 3 shows an example of a format of a signaling transport converter protocol data unit (PDU) according to the embodiment.

A STC PDU, as depicted, for example, in FIG. 3, may be used to exchange signaling messages, STC User Data, and the like, between STC user peer entities via TCP/IP under involvement of the Message Wrapper 16. Generally, the format of the STC PDU according to FIG. 3 includes several octets 1 to N and comprises a Message Wrapper protocol control information 25 as well as STC user data 26, or the like. The Message Wrapper protocol control information 25 may comprise a Marker field comprising 16 octets, for example, and a Length field comprising 4 octets, for example. The Marker is usable to separate the respective messages from each other. The value of Length includes the number of octets of the Message Wrapper Control information as well as the number of the STC user data. According to the embodiment, the length of such a signaling message is not limited to a certain length. The maximum achievable length of such a signaling message is determined by the number of octets dedicated to the Length field. In the present embodiment, a value of four octets is used for the Length field. However, it is to be noted that with other underlying layers than TCP, e.g. SSCOP, the length of such a signaling message may not exceed the maximum length indicated in a Max_Length parameter. In case of STC/TCP, such a parameter is not necessary. The STC 15 invoking the Message Wrapper 16 adds the Message Wrapper protocol control information to the message. If the length of the whole PDU exceeds the discovered path MTU size, then a fragmentation/reassembly functionality may be provided by the TCP.

As another element for the Peer-to-Peer communication, there may be provided one or more STC timers which are required by the STC entity. According to the embodiment, the STC timer comprises a timer referred to as Timer_DELAY. When this timer is running, the TCP service is unavailable. By means of this, an unnecessary consumption of resources can be avoided if a TCP association could not be established or has been released. The expiry of this timer leads to a re-establishment attempt of the TCP association. The timer value is described below.

The following STC parameters are specified at creation of a new STC entity and they are unchanged during the lifetime of the STC entity: a) STC_DTA: The value of this parameter specifies the remote destination transport IP address and port number, used by the STC entity to initiate a TCP connection.

b) STC_LP: The value of this parameter specifies the port number that the local TCP endpoint should bind at initialization.

c) Value of Timer_DELAY: The value of Timer_DELAY can be in the range of 800 to 1500 ms.

Furthermore, there is one STC parameter that is calculated once during the lifetime of the STC entity. This parameter is STC_LCN, which contains the Local Connection Name the TCP entity associates to a connection during establishment.

Figure 5:
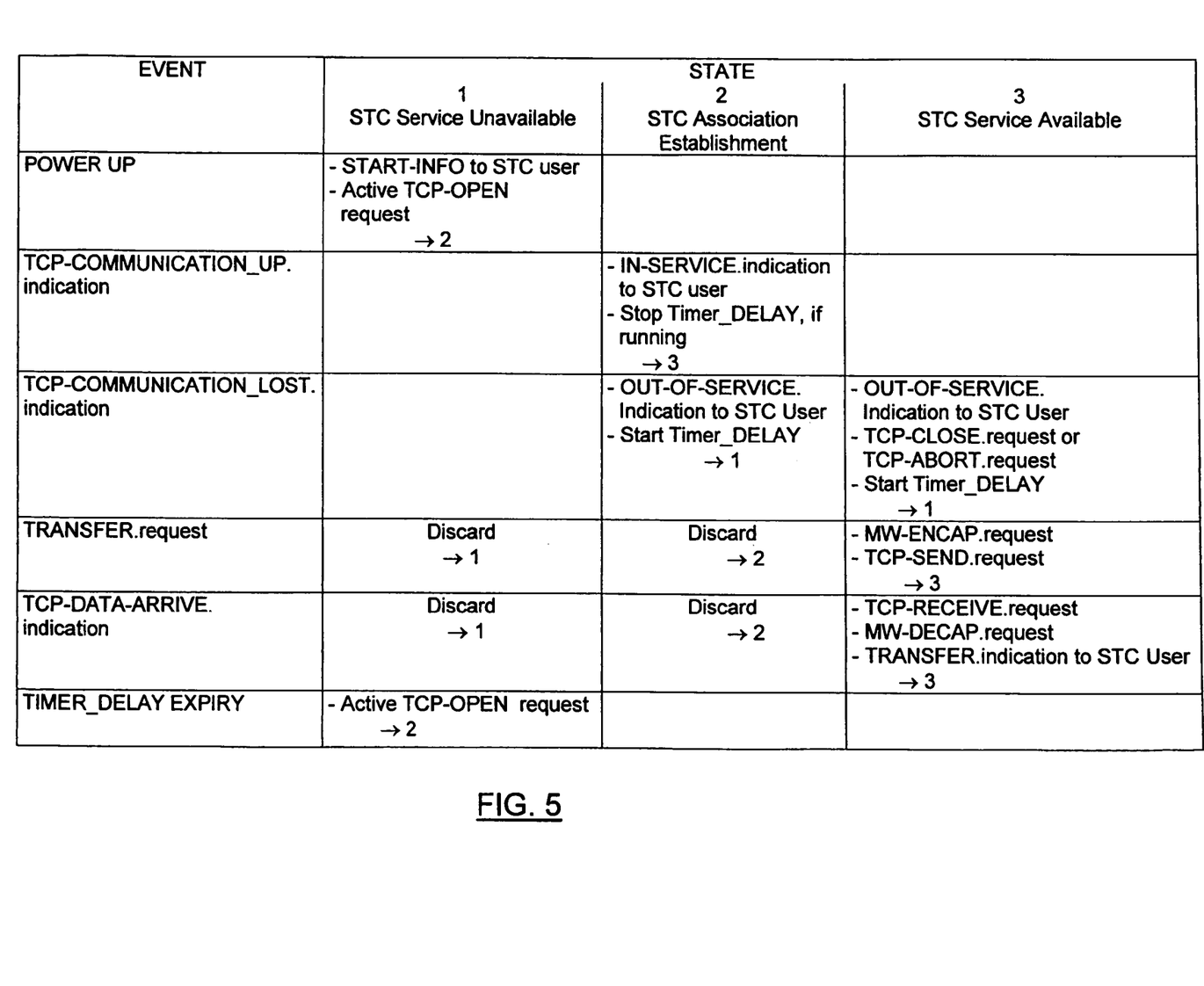
FIG. 5 shows a diagram illustrating a state transition of a signaling transport converter according to the embodiment.

Next, with reference to FIG. 5, states of the STC 15 as well as procedures executed by the STC 15 are described. In detail, an illustration of state transitions for the STC and a description of information elements and/or primitives which lead to state transitions are given.

First, the states in which the STC 15 may be are defined, as shown in FIG. 5. The following states are used in the specification of the peer-to-peer protocol. The states indicated therein are conceptual and shall only reflect the general condition of the STC entity in the sequences of primitives and PDU exchanges with its user, peer, and/or underlying sublayer (i.e. TCP).

State 1: STC Service Unavailable:

In this state, no data are sent in either direction. The STC is not able to transfer STC user signaling messages. Furthermore, if, for example, the STC user 11 submits data for transfer with a TRANSFER.request primitive (described later), the primitive is ignored.

State 2: STC Association Establishment:

In this state, TCP service is not yet available. The STC instructs the TCP to establish a new connection with its peer and awaits the peer's response. If the STC user 11 submits data for transfer with the TRANSFER.request primitive, the primitive is ignored.

State 3: STC Service Available:

In this state, TCP service is available and data transfer takes place.

Next, the procedures executed by the STC on TCP 15 according to the embodiment are described with reference To FIG. 5. In this connection, it is to be noted that different implementations of TCP may lead to differences in its primitives. In the following, a generalized implementation of TCP primitives is given. Other implementation types may comprise differences in some details, while the general principles should be in line with the following description.

First, initial conditions are described. For example, a situation is described how the STC operates, for example, at a power up event. At the power up event, the STC state is STC service unavailable. The STC sends a START-INFO.indication primitive containing the CIC_Control and the Max_Length parameters to STC user. The Max_Length parameter should be set according to the number of octets used in the Message Wrapper Length field. The parameter CIC_Control may be set to 0 in a case where this parameter is not used (such as, for example, in an IP based BTS architecture application). Then, the STC 15 requests the TCP sublayer to open the TCP connection with an TCP-OPEN.request primitive with active/passive flag set to active. The destination IP address and port number, local port number is included therein. Then, the STC state changes to STC association establishment state.

When a TCP-COMMUNICATION_UP.indication primitive is received during the STC association establishment state, the STC 15 may then send an IN-SERVICE.indication primitive to the STC user 11. Examples for the attributes carried in these primitives are shown in following Table 4.

TABLE 4

Primitives and parameters in open procedure

| Primitive | Attributes | Content |
| --- | --- | --- |
| TCP-OPEN.request | Destination transport IP address & port | Value of STC_DTA |
|  | Local port number | Value of STC_LP |
|  | Active/passive flag | "Active" |
| TCP-COMMUNICATION_UP. Indication (Note 1) | Local Connection Name | To be stored in STC-LCN |

NOTES
Depending on the implementation there doesn't exist a dedicated TCP-COMMUNICATION_UP.indication but the Local Connection Name (LCN) is the return value of the TCP-OPEN.request.

Once the TCP connection is established, the TCP 19 monitors by default the reachability of its peer in case of absence of data transfer by sending probes. A series of probes is sent a certain time after the last data transfer. In case the peer doesn't answer to any of the probes the TCP connection is terminated.

The functionality can be enabled/disabled per TCP connection.

The TCP connection timeout is implementation specific and may be for some implementations in the range of hours. Such a huge timeout does not add any value to signaling applications, so that this function may be disabled.

Next, the procedures of the STC on TCP 15 in case of sending a signaling message is described. It is assumed that the STC state is the STC service available state. Now, upon receipt of a TRANSFER.request primitive from the STC user 11, the STC invokes MW-ENCAP.request with the signaling message and places the result into an STC PDU. Then, the PDU is transferred to the TCP 19 using the TCP-SEND.request primitive. The primitive may carry the parameters Local Connection Name (value stored in STC-LCN upon establishment of the TCP connection), Buffer Address and Length.

Additionally a PUSH flag may be set in order to request from TCP 19 that the data are transmitted promptly to the receiver (i.e. to the peer signaling entity). After completion of the transfer of the data, the state of the STC may remain the STC service available state.

It is to be noted that in case a TRANSFER.request is received when the STC 15 is in a state other than the STC service available state, i.e. in one of the states STC service unavailable and STC association establishment, the data may be discarded and the STC 15 remains in the current state without changing (except for the case that the STC state is to be changed due to another event, for example power up and the like). This is indicated by the respective arrows pointing to the same state as the present one.

On the other hand, the procedure in case of receiving a signaling message is as follows. Equivalent to the sending case described above, the STC is in the STC service available state. Upon receipt of a TCP-DATA-ARRIVE.indication primitive from TCP 19, the STC 15 requests the retrieval of the STC PDU with a TCP-RECEIVE.request primitive. In this connection, it is to be noted that TCP-DATA-ARRIVE represents an indication generated by TCP to inform the served user about arrival of data. Then the PDU is transferred to the Message Wrapper 16 using a MW-DECAP.request primitive. It is to be noted that a TCP segment may comprise partial and/or complete STC user signaling messages.

In case the Message Wrapper 16 has not completed the reassembly due to outstanding data, no data are handed over to the STC 15. On the other hand, if the Message Wrapper 16 has detected an error, the STC 15 is informed and the affected data are discarded. However, in case the Message Wrapper 16 has completed the reassembly of the STC user data, the data (one or more STC user signaling messages) is handed over to the STC 15. As consequence of the latter case, the STC 15 passes the pure STC user data to the STC user (signaling entity 11) by means of a TRANSFER.indication primitive. After completion of the transfer of the data, the state of the STC may remain the STC service available state.

It is to be noted that similar to the above in case a TCP-DATA-ARRIVE.indication is received when the STC 15 is in a state other than the STC service available state, i.e. in one of the states STC service unavailable and STC association establishment, the data may be discarded and the STC 15 remains in the current state without changing (except for the case that the STC state is to be changed due to another event, for example power up and the like). This is indicated by the respective arrows pointing to the same state as the present one.

Now, a destination availability procedure is described. On the receipt of an TCP-COMMUNICATION_LOST.indication primitive from the TCP 19 in one of the STC association establishment state or the STC service available state, the STC 15 indicates the unavailability of the data transfer to the STC user 11 with an OUT-OF-SERVICE.indication primitive. Generally, TCP-COMMUNICATION_LOST.indication represents, depending on the TCP implementation, one or many indications generated by TCP that inform the served user about unavailability of the TCP connection. The Layer Management may also be informed in such a case via an MSTC-TCP-COMMUNICATION_LOST.indication primitive (see also Table 3). At the TCP Client/Server side, the timer Timer_DELAY is started.

Furthermore, in the STC service available state, in order to avoid having half-open TCP connections, the STC 15, upon receipt of a TCP-COMMUNICATION_LOST.indication primitive from the TCP 19, may also be adapted to terminate the TCP connection by using a TCP-CLOSE.request or a TCP-ABORT.request primitive.

Then, the state of the STC 15 is changed to the STC service unavailable state.

On the other hand, upon receipt of a TCP-COMMUNICATION_UP.indication primitive from the TCP 19, the STC 15 indicates the availability of the data transfer to the STC user 11 with an IN-SERVICE.indication primitive (the value of Congestion Level parameter in this primitive is implementation dependent). Timer_Delay is cancelled if running. The Layer Management may also be informed via an MSTC-TCP-COMMUNICATION_UP.indication (not shown in FIG. 5) primitive. Then, the state of the STC 15 is changed to the STC service available state.

When the Timer_Delay expires, the STC requests the TCP sublayer 19 to open the TCP connection with an TCP-OPEN-.request primitive, as described in connection with the initial condition. It is to be noted that the congestion notification from the TCP 19 to the STC 15 may be implementation dependent. In general, the STC is adapted to handle the congestion event received from TCP and to provide the means to report to the STC user 11 with a (not shown in FIG. 5) CONGESTION.indication primitive (comprising a Congestion Level parameter).

Next, the message wrapper unit (or Message Wrapper) 16 as a sub-component of the STC on TCP 15 is described in further detail. The functionality of the message wrapper unit 16 is described also with reference to FIG. 6, in which an example of mapping STC PDUs to transmission control protocol packets is illustrated.

TCP provides both reliable data transfer and strict order-of-transmission delivery of data. However, the stream-oriented nature of TCP is not optimal when messages are to be conveyed. The reason is that applications must then add their own record marking in order to delineate their messages. Furthermore, they must make explicit use of the push facility to ensure that a complete message is transferred in a reasonable time.

According to the embodiment, the above mentioned record marking can be implemented by means of a message wrapper layer or unit 16. The message wrapper unit 16 comprises preferably the following functionality:

Each message is prepended by a Message Header (comprising the message wrapper protocol control information) consisting of a 16-byte marker and a 4-byte length field. This is also shown in the illustration of the message wrapper PDU 30 according to FIG. 6. The marker can be used for synchronization. The value (i.e. the content) of the marker is fixed, for example. The actual value of the marker may be implementation dependent. As one example, some uncorrelated noise-like sequence can be used in this connection.

The Message Wrapper layer or unit 16 is adapted to detect such a marker in a TCP stream.

If the marker is detected, synchronization is assumed and the next four bytes are interpreted as a length field. Then the next 'value of Length field'-20 bytes (marker+length field) are regarded as a message.

According to the embodiment, since no padding is allowed, the next marker must immediately follow after this.

If no bytes are available after a message, the message will be immediately forwarded to the next higher layer. If TCP delivers new bytes afterwards, the next 16 bytes must be a marker. Otherwise, the system became 'Out-of-Sync'.

If some bytes are already available after the message, they must belong to the marker (if 16 bytes are already available, they must be the marker). Otherwise, the system is 'Out-of-Sync', and the message is not forwarded.

If the 'Out-of-Sync' state is entered, a 'Receive Error' may be indicated to upper layer, and the received TCP stream (after the last received marker which was not followed by a correct Length field) is searched for the next Marker in order to reach an 'In-Sync' state again.

Once the 'In-Sync' state is entered (i.e. after the first marker has been found), the message wrapper remains in this state as long as the TCP connection endures since TCP is generally reliable and bytes do not get lost. It is to be noted that the above 'Out-of-Sync' state is only needed as a protection against a flawed implementation. Namely, the other peer entity might induce some spurious bytes, and it is to be preferred to be able to recover from such a situation.

Figure 6:
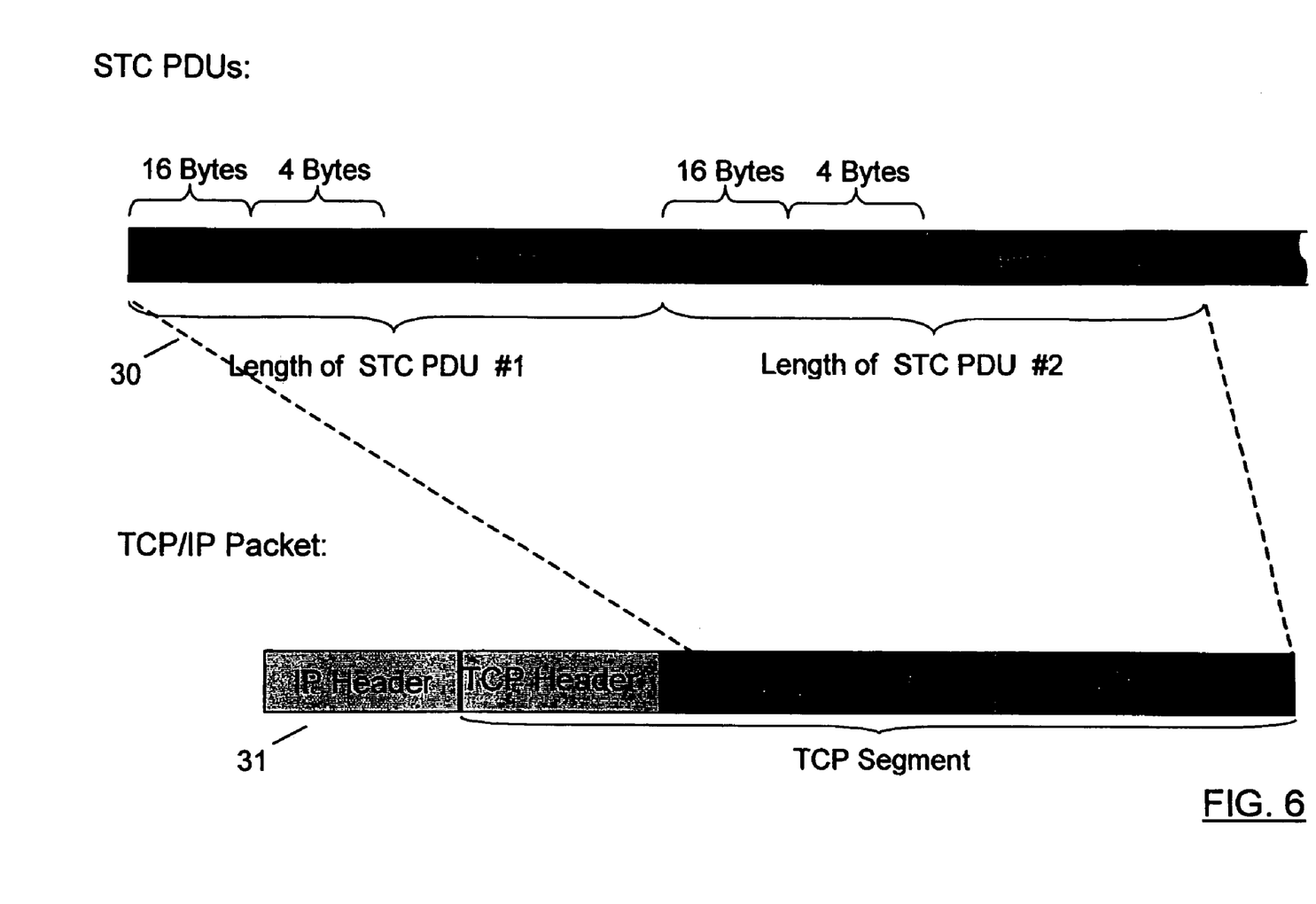
FIG. 6 shows an example of mapping STC PDUs to transmission control protocol packets according to the embodiment.

Next, the mapping of STC Protocol Data Units 30 into TCP segments 31 is described with reference to FIG. 6. TCP transfers a contiguous stream of octets through the network. It is not necessary for the application to chop the data into basic blocks or datagrams. Such the STC forwards the STC PDU as a contiguous octet stream. If a message is completed and no other signaling message transfer has been requested the STC may invoke the TCP push function to deliver the current message immediately to its peer. It is to be noted that more than one STC PDU may be comprised in one TCP packet.

As described above, for transmitting data in a communication network between a signaling entity and a peer signaling entity through a transport layer, such as TCP, a signaling transport converter STC on TCP is implemented. The STC on TCP provides a signaling transport service for a connection between the signaling entity and the transport layer and comprises an interface to the signaling entity and an interface to the transport layer. The STC on TCP processes data to be exchanged between the signaling entity and the transport layer for a transparent transfer of the data to the peer signaling entity by means of the TCP transport layer. For providing a transaction-oriented data transport service, the STC on TCP may include a Message Wrapper which delineates a TCP based message stream and encapsulates/decapsulates the data to be exchanged.

It should be understood that the above description of the preferred embodiment as well as the accompanying figures are merely intended to illustrate the present invention by way of example only. The skilled person is aware of possible modifications and variations lying within the scope of the invention, so that the present invention may vary within the coverage area of the attached claims which define the scope of the invention.

The invention claimed is:

1. A system, comprising:
a signaling entity;
a peer signaling entity configured to transmit data in a communication network through a transport layer based on the TCP transmission control protocol, and
a signaling transport converter configured to provide a signaling transport service for a connection between the signaling entity and the transport layer,
wherein the signaling transport converter is based on a generic signaling transport service according to ITU-T Q.2150.0 specification,
wherein the signaling transport converter comprises an interface to the signaling entity and an interface to the transport layer, and
wherein the signaling transport converter is configured to process data to be exchanged between the signaling entity and the transport layer for a transparent transfer of the data to the peer signaling entity by the transport layer,
wherein the signaling transport converter further comprises a message wrapper unit which is configured to provide a transaction-oriented data transport service used for processing the data to be exchanged, and
wherein the message wrapper unit is configured
to encapsulate the data to be exchanged in the direction from the signaling entity to the transport layer, and
to decapsulate the data to be exchanged in the direction from the transport layer to the signaling entity,
wherein the message wrapper unit is further configured
to prepend a message header before a message comprising at least a part of the data to be exchanged for encapsulating the data to be exchanged,
wherein the message header comprises at least a record marking for delineating the message with regard to a message stream based on the protocol used by the transport layer.

2. An apparatus, comprising:
a transmitter configured to transmit data in a communication network through a transport layer based on the TCP transmission control protocol,
wherein the apparatus is based on a generic signaling transport service according to ITU-T Q.2150.0 specification and configured to provide a signaling transport service for a connection between a signaling entity and a transport layer;
an interface to the signaling entity;
an interface to the transport layer;
a processor configured to process data to be exchanged between the signaling entity and the transport layer for a transparent transfer of the data to the peer signaling entity by the transport layer;
a message wrapper unit configured to provide a transaction-oriented data transport service used for processing the data to be exchanged, and
wherein the message wrapper unit is configured
to encapsulate the data to be exchanged in the direction from the signaling entity to the transport layer,
to decapsulate the data to be exchanged in the direction from the transport layer to the signaling entity, and
to prepend a message header before a message comprising at least a part of the data to be exchanged for encapsulating the data to be exchanged,
wherein the message header comprises at least a record marking for delineating the message with regard to a message stream based on a the protocol used by the transport layer.

3. The apparatus according to claim 2, wherein a value of the record marking is fixed.

4. The apparatus according to claim 3, wherein the value of the record marking correlates to an uncorrelated noise-like sequence.

5. The apparatus according to claim 2, wherein the message header further comprises a length field indicating the length of the message comprising the data to be exchanged and the length of the message header.

6. The apparatus according to claim 2, wherein the message wrapper unit is configured to identify the record marking in a message stream for decapsulating the data to be exchanged based on the protocol used by the transport layer.

7. The apparatus according to claim 2, wherein the message wrapper unit is configured to use the record marking for synchronization.

8. The apparatus according to claim 7, wherein the message wrapper unit is configured to interpret data following after the identified record marking as a length field or as the message comprising at least a part of the data to be exchanged.

9. The apparatus according to claim 2, wherein the message wrapper unit is configured to process the data to be exchanged by providing a plurality of messages each of which comprising at least a part of the data to be exchanged, and by prepending a respective message header before each of the plurality of messages for encapsulating the data to be exchanged.

10. The apparatus according to claim 2, wherein information elements are transmitted between the apparatus and the signaling entity for controlling the apparatus.

11. The apparatus according to claim 2, wherein information elements are transmitted between the apparatus and the transport layer for controlling the apparatus.

12. The apparatus according to claim 2, wherein information elements are transmitted between the apparatus and the message wrapper unit for controlling the apparatus or the message wrapper unit.

13. The apparatus according to claim 2, further comprising:
a signaling transport converter configured to establish and maintain a connection to the transport layer on behalf of the signaling entity.

14. The apparatus according to claim 2, further comprising:
a signaling transport converter configured to monitor an availability status of data transfer through the transport layer and to inform the signaling entity about the availability status.

15. The apparatus according to claim 2, wherein the signaling entity is a signaling application provided on a layer being different to the transport layer.

16. The apparatus according to claim 2, wherein the apparatus is provided in a sub-layer on top of the transport layer.

17. The apparatus according to claim 2, wherein the apparatus comprises a signaling transport converter.

18. A method, comprising:
providing a signaling transport service to exchange data by means of connecting a signaling entity and a transport layer based on the TCP transmission control protocol,
wherein the providing of the signaling transport service further comprises
receiving and transmitting data to be exchanged in a communication network between the signaling entity and the transport layer in a signaling transport converter based on a generic signaling transport service according to ITU-T Q.2150.0 specification;
processing the data to be exchanged between the signaling entity and the transport layer in the signaling transport converter;
transparently transferring the data to the peer signaling entity by means of the transport layer;
providing a transaction-oriented data transport service which is used for processing the data to be exchanged in a message wrapper unit of the signaling transport converter;
encapsulating the data to be exchanged in the direction from the signaling entity to the transport layer in the message wrapper unit;
decapsulating the data to be exchanged in the direction from the transport layer to the signaling entity in the message wrapper unit; and
prepending, in the message wrapper unit, a message header before a message comprising at least a part of the data to be exchanged for encapsulating the data to be exchanged, wherein the message header comprises at least a record marking for delineating the message with regard to a message stream based on the protocol used by the transport layer.

19. The method according to claim 18, wherein the prepending of the message header comprises fixing a value of the record marking.

20. The method according to claim 19, wherein the fixing of a value comprises correlating the value of the record marking to an uncorrelated noise-like sequence.

21. The method according to claim 18, wherein the prepending of the message header further comprises prepending the message header, in which the message header further comprises a length field indicating the length of the message comprising the data to be exchanged and the length of the message header.

22. The method according to claim 18, wherein the decapsulating of the data to be exchanged comprises identifying the record marking in a message stream based on the protocol used by the transport layer.

23. The method according to claim 22, further comprising:
using the record marking for synchronization.

24. The method according to claim 22, further comprising:
interpreting data following after the identified record marking as a length field or as the message comprising at least a part of the data to be exchanged.

25. The method according to claim 18, wherein the processing of the data further comprises providing a plurality of messages each comprising at least a part of the data to be exchanged, and prepending a respective message header before each of the plurality of messages for encapsulating the data to be exchanged.

26. The method according to claim 18, further comprising:
transmitting information elements between the signaling transport converter and the signaling entity for controlling the signaling transport converter.

27. The method according to claim 18, further comprising:
transmitting information elements between the signaling transport converter and the transport layer for controlling the signaling transport converter.

28. The method according to claim 18, further comprising: transmitting information elements between the signaling transport converter and the message wrapper unit for controlling the signaling transport converter or the message wrapper unit.

29. The method according to claim 18, further comprising:
establishing and maintaining a connection to the transport layer on behalf of the signaling entity by the signaling transport converter.

30. The method according to claim 18, further comprising:
monitoring an availability status of data transfer through the transport layer by the signaling transport converter; and
informing the signaling entity about the availability status by the signaling transport converter.

31. The method according to claim 18, wherein the signaling entity comprises a signaling application provided on a layer being different to the transport layer.

32. The method according to claim 18, further comprising:
providing the signaling transport service in a sub-layer on top of the transport layer.

33. An apparatus, comprising:
transmitting means for transmitting data in a communication network through a transport layer based on the TCP transmission control protocol, wherein the apparatus is based on a generic signaling transport service according to ITU-T Q.2150.0 specification and provides a signaling transport service for a connection between a signaling entity and a transport layer;
interface means for interfacing to the signaling entity;
transport layer interface means for interfacing to the transport layer; and
processing means for processing data to be exchanged between the signaling entity and the transport layer for a transparent transfer of the data to the peer signaling entity by the transport layer,
wherein the apparatus further comprises message wrapper means for providing a transaction-oriented data transport service used for processing the data to be exchanged, and
wherein the message wrapper means encapsulates the data to be exchanged in the direction from the signaling entity to the transport layer, and
decapsulates the data to be exchanged in the direction from the transport layer to the signaling entity,
wherein the message wrapper means further prepends a message header before a message comprising at least a part of the data to be exchanged for encapsulating the data to be exchanged,
wherein the message header comprises at least a record marking means for delineating the message with regard to a message stream based on a the protocol used by the transport layer.

34. A computer program product for a computer, comprising software code portions for making, when said product is run on the computer, said computer to function as a signaling transport service provider, wherein the computer program product is configured to execute steps of:
providing a signaling transport service to exchange data by means of connecting a signaling entity and a transport layer based on the TCP transmission control protocol,
wherein the providing of the signaling transport service further comprises
receiving and transmitting data to be exchanged in a communication network between the signaling entity and the transport layer in a signaling transport converter based on a generic signaling transport service according to ITU-T Q.2150.0 specification;
processing the data to be exchanged between the signaling entity and the transport layer in the signaling transport converter;
transparently transferring the data to the peer signaling entity by means of the transport layer;
providing a transaction-oriented data transport service which is used for processing the data to be exchanged in a message wrapper unit of the signaling transport converter;
encapsulating the data to be exchanged in the direction from the signaling entity to the transport layer in the message wrapper unit;
decapsulating the data to be exchanged in the direction from the transport layer to the signaling entity in the message wrapper unit; and
prepending, in the message wrapper unit, a message header before a message comprising at least a part of the data to be exchanged for encapsulating the data to be exchanged, wherein the message header comprises at least a record marking for delineating the message with regard to a message stream based on the protocol used by the transport layer.

* * * * *